(12) United States Patent
Liu et al.

(10) Patent No.: US 11,432,148 B2
(45) Date of Patent: Aug. 30, 2022

(54) METHOD AND APPARATUS FOR CONFIGURING AND DETECTING INFORMATION INTEGRITY

(71) Applicant: ZTE CORPORATION, Guangdong (CN)

(72) Inventors: Zhuang Liu, Shenzhen (CN); Yin Gao, Shenzhen (CN); He Huang, Shenzhen (CN); Yang Liu, Shenzhen (CN); Jiren Han, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/176,703

(22) Filed: Feb. 16, 2021

(65) Prior Publication Data

US 2021/0168608 A1 Jun. 3, 2021

Related U.S. Application Data

(63) Continuation of application No. PCT/CN2018/101293, filed on Aug. 20, 2018.

(51) Int. Cl.
*H04W 12/06* (2021.01)
*H04W 12/106* (2021.01)
*H04W 12/122* (2021.01)

(52) U.S. Cl.
CPC ......... *H04W 12/06* (2013.01); *H04W 12/106* (2021.01); *H04W 12/122* (2021.01)

(58) Field of Classification Search
CPC .. H04W 12/06; H04W 12/122; H04W 12/106
See application file for complete search history.

(56) References Cited

U.S. PATENT DOCUMENTS 9,686,687 B2* 6/2017 Peng ................. H04W 12/08
10,158,602 B2* 12/2018 Lee .................... H04L 61/2015
(Continued)

FOREIGN PATENT DOCUMENTS

| CN | 103650554 A | 3/2014 |
|---|---|---|
| CN | 105981346 A | 9/2016 |

(Continued)

OTHER PUBLICATIONS

3GPP: "Technical Specification Group Radio Access Network; Study on Integrated Access and Backhaul" (Release 15) 3GPP TR 38.874 V0.4.0; 3rd Generation Partnership Project, Mobile Competence Centre; 650, Route Des Lucioles; F-06921 Sophia-Antipolis Cedex, France; Aug. 9, 2018 (55 pages).

(Continued)

*Primary Examiner* — Viral S Lakhia
(74) *Attorney, Agent, or Firm* — Foley & Lardner LLP

(57) ABSTRACT

A method and apparatus for configuring and detecting information integrity, and for discovering fake base stations is disclosed. In one embodiment, a method for authenticating a first wireless communication, includes: transmitting a first message from a first unit of the first wireless communication node to a second unit of the first wireless communication node, wherein the first message comprises first integrity information of at least one first information block in a system message configured by the first unit; receiving a second message by the first unit of the first wireless communication node from the second unit of the first wireless communication node, wherein the second message comprises second integrity information of at least one second information block in the system message configured by the second unit; and transmitting a third message from the first wireless communication node to a wireless communication device.

19 Claims, 11 Drawing Sheets

(56) References Cited

U.S. PATENT DOCUMENTS

| | | | |
|---|---|---|---|
| 10,306,470 B2* | 5/2019 | Agiwal | H04W 12/122 |
| 10,397,197 B2* | 8/2019 | Sun | H04W 4/21 |
| 10,462,764 B2* | 10/2019 | Liu | H04W 4/023 |
| 10,542,425 B2* | 1/2020 | Baek | H04W 12/041 |
| 10,567,964 B2 | 2/2020 | Tenny | H04W 12/06 |
| 11,157,901 B2* | 10/2021 | Van | H04L 9/14 |
| 11,296,890 B2* | 4/2022 | Torvinen | H04L 9/3242 |
| 2017/0238177 A1* | 8/2017 | Lee | H04M 7/0078 |
| | | | 455/411 |
| 2017/0295489 A1 | 10/2017 | Agiwal et al. | |
| 2018/0124602 A1 | 5/2018 | Nair et al. | |
| 2018/0124697 A1 | 5/2018 | Nair et al. | |
| 2021/0235271 A1* | 7/2021 | Bergquist | H04L 63/205 |
| 2022/0104013 A1* | 3/2022 | Lamberton | H04W 12/35 |

FOREIGN PATENT DOCUMENTS

| | | |
|---|---|---|
| CN | 107613533 A | 1/2018 |
| CN | 108351947 A | 7/2018 |
| WO | WO-2018/144961 A1 | 8/2018 |

OTHER PUBLICATIONS

Extended European Search Report for EP Appl. No. 18930177.3, dated May 17, 2021 (11 pages).

International Search Report and Written Opinion for PCT Appl. No. PCT/CN2018/101293 dated May 21, 2019 (7 pages).

First Office Action for CN Appl. No. 201880096473.2, dated Mar. 3, 2022 (with English translation, 8 pages).

Ericsson, "New Solution: UE-assisted false base station detection" 3GPP TSG-SA WG3 Meeting #86, S3-170463, Feb. 10, 2017, Sophia Antipolis, France (6 pages).

Ericsson, "Ownership and delivery of system information" 3GPP TSG RAN WG3 Meeting #97, R3-173961, Oct. 13, 2017, Prague, Czech Republic (10 pages).

First Office Action for JP Appl. No. 2021-509750, dated May 19, 2022 (8 pages, with English translation).

* cited by examiner

METHOD AND APPARATUS FOR CONFIGURING AND DETECTING INFORMATION INTEGRITY

CROSS-REFERENCE TO RELATED APPLICATIONS

This application claims the benefit of priority under 35 U.S.C. § 120 as a continuation of PCT Patent Application No. PCT/CN2018/101293, filed on Aug. 20, 2018, the disclosure of which is incorporated herein by reference in its entirety.

TECHNICAL FIELD

This disclosure relates generally to wireless communications and, more particularly, to a method and apparatus for configuring and detecting information integrity, and for authenticating a base station according to integrity information in a system message.

BACKGROUND

A "fake" base station, sometimes called Pseudo Base Station (PBS), Malicious Base Station, or IMSI (International Mobile Subscriber Identity) catcher, refers to a cellular base station that is employed for malicious and usually illegal purposes. Fake base stations can be portable and thus be readily deployed in highly populated regions. Since they operate in a same network frequency range as a legal base station and can provide a stronger signal, wireless user equipment UEs can quickly join a fake network after entering a coverage area of fake base stations. Unfortunately, wireless UEs usually cannot distinguish between a valid base station and a fake base station, because current protocols do not require verification of the base stations by the UEs. After establishing the connection to the fake base station, such fake base station can steal personal information from neighboring UEs, and can also send links to viruses and fraud messages to the neighboring UEs. Thus, attacks from fake base stations is a significant security challenge faced by wireless UEs.

SUMMARY OF THE INVENTION

The exemplary embodiments disclosed herein are directed to solving the issues related to one or more problems presented in the prior art, as well as providing additional features that will become readily apparent by reference to the following detailed description when taken in conjunction with the accompany drawings. In accordance with various embodiments, exemplary systems, methods, and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

Currently, there is no standard protocols or solutions toward discovering fake stations. Generally, this is up to the implementation of the product. For example, one of the most commonly used methods is that the manufacturer can collect features of fake base stations using UEs, to create a database of features from fake base stations. This data base can then be used to compare one or more characteristic features from a currently connected base station to the features saved in the data base so as to determine whether the base station is a fake or a valid base station. However, this method is a passive, defensive approach, since it is difficult for a manufacturer to establish a complete data base of characteristic features of fake base stations, which are dynamic and constantly changing. For example, when a UE is connected to a fake base station with new characteristic features, it cannot be recognizable according to the existing data base. Furthermore, fake base stations can even partially duplicate the characteristics of a valid base station. Making the discovery of fake base stations using this method difficult. Therefore, there exists a need to develop a method and apparatus for authenticating base stations and discovering fake base stations.

In one embodiment, a method for authenticating a first wireless communication, includes: transmitting a first message from a first unit of the first wireless communication node to a second unit of the first wireless communication node, wherein the first message comprises first integrity information of at least one first information block in a system message configured by the first unit; receiving a second message by the first unit of the first wireless communication node from the second unit of the first wireless communication node, wherein the second message comprises second integrity information of at least one second information block in the system message configured by the second unit; and transmitting a third message from the first wireless communication node to a wireless communication device, wherein the third message comprises third integrity information and is configured to be used by the wireless communication device to determine fourth integrity information.

In a further embodiment, a method for authenticating a first wireless communication, includes: transmitting a first message from the first wireless communication node to a second wireless communication node, wherein the first message comprises first integrity information of at least one first information block in a system message configured by the first wireless communication node; receiving a second message by the first wireless communication node from the second wireless communication node, wherein the second message comprises second integrity information of at least one second information block in the system message configured by the second wireless communication node; transmitting a third message from the first wireless communication node to a wireless communication device, wherein the third message comprises first integrity information, and is configured to be used by the wireless communication device to determine third integrity information.

In another embodiment, a method for authenticating a first wireless communication, includes: receiving a first message by a first unit of the first wireless communication node from a wireless communication device; receiving a second message by a second unit of the first wireless communication node from the first unit of the first wireless communication node, wherein the second message comprises first integrity information of at least one first information block configured by the first unit; transmitting a third message from the second unit of the first wireless communication node to the wireless communication device, wherein the third message comprises second integrity information of at least one second information block, and is configured to be used by the wireless communication device to determine third integrity information.

Yet in another embodiment, a computing device comprising at least one processor and a memory coupled to the processor, the at least one processor configured to carry out the method.

Yet, in another embodiment, a non-transitory computer-readable medium having stored thereon computer-executable instructions for carrying out the method.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

DETAILED DESCRIPTION OF EXEMPLARY EMBODIMENTS

Figure 1A:
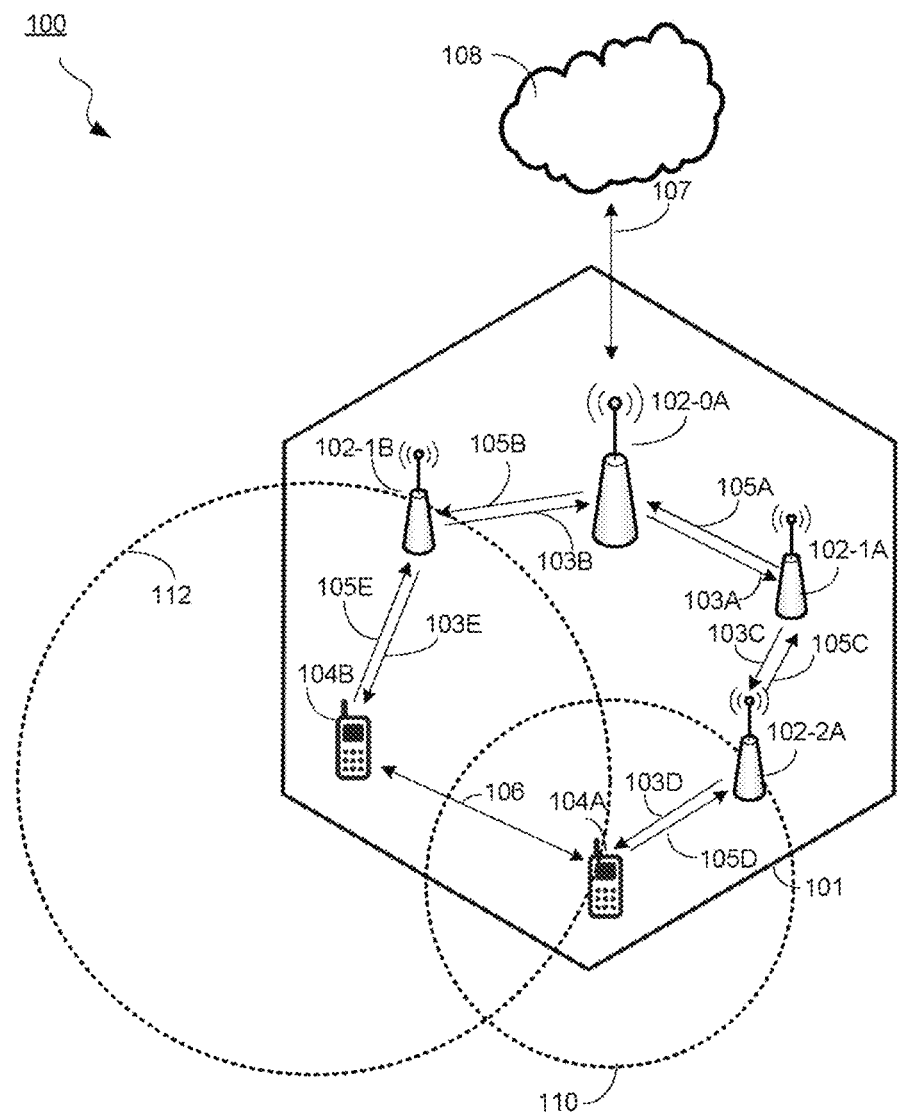
FIG. 1A illustrates an exemplary wireless communication network, in accordance with some embodiments of the present disclosure.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described or illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Embodiments of the present invention are described in detail with reference to the accompanying drawings. The same or similar components may be designated by the same or similar reference numerals although they are illustrated in different drawings. Detailed descriptions of constructions or processes well-known in the art may be omitted to avoid obscuring the subject matter of the present invention. Further, the terms are defined in consideration of their functionality in embodiment of the present invention, and may vary according to the intention of a user or an operator, usage, etc. Therefore, the definition should be made on the basis of the overall content of the present specification.

FIG. 1A illustrates an exemplary wireless communication network 100, in accordance with some embodiments of the present disclosure. In a wireless communication system, a network side communication node or a base station (BS) can be a node B, an E-utran Node B (also known as Evolved Node B, eNodeB or eNB), a gNodeB (also known as gNB) in new radio (NR) technology, a pico station, a femto station, or the like. A terminal side node or a user equipment (UE) can be a long range communication system like a mobile phone, a smart phone, a personal digital assistant (PDA), tablet, laptop computer, or a short range communication system such as, for example a wearable device, a vehicle with a vehicular communication system and the like. A network and a terminal side communication node are represented by a BS 102 and a UE 104, respectively, and in all the embodiments in this disclosure hereafter, and are generally referred to as "communication nodes" herein. Such communication nodes may be capable of wireless and/or wired communications, in accordance with various embodiments of the invention. It is noted that all the embodiments are merely preferred examples, and are not intended to limit the present disclosure. Accordingly, it is understood that the system may include any desired combination of UEs and BSs, while remaining within the scope of the present disclosure.

Referring to FIG. 1A, the wireless communication network 100 includes a first BS 102A (e.g., gNB), a second BS 102B (e.g., eNB), a first UE 104A (e.g., NR-UE), and a second UE 104B (e.g., LTE-UE). The UE 104A each can be a vehicle that is moving in a first cell 101 covered by the BS 102A and a second cell 110 covered by the BS 102B. In some embodiments, the first cell 101 is in the second cell 110. In some embodiments, the UE 104A has direct communication channels 103-1A and 103-1B with the BS 102A as well as the BS 102B, respectively. Similarly, the UE 104B can be also a vehicle that is moving in the same cell 110 covered by the BS 102B, but may not have a direct communication channel with the BS 102A or is out of coverage of the cell 101. Although the UE 104b does not have a direct communication channel with the BS 102A, it forms a direct communication channel 105 with its neighbor UEs, e.g., UE 104A within a sidelink (SL) communication group 112. The direct communication channels between the UE 104 and the BS 102 can be through interfaces such as an Uu interface, which is also known as UMTS (Universal Mobile Telecommunication System (UMTS)) air interface. The direct communication channels 105 between the UEs can be through a PC5 interface, which is introduced to address high moving speed and high density applications such as Vehicle-to-everything (V2X) and Vehicle-to-Vehicle (V2V) communications. The BS 102 is connected to a core network (CN) 108 through an external interface 107, e.g., an Iu interface.

The UE 104A obtains its synchronization timing from the corresponding BS 102A, which obtains its own synchronization timing from the core network 108 through an internet time service, such as a public time NTP (Network Time Protocol) server or a RNC (Radio Frequency Simulation System Network Controller) server. This is known as network-based synchronization. Alternatively, the BS 102A can also obtain synchronization timing from a Global Navigation Satellite System (GNSS) 109 through a satellite signal 106, especially for a large BS in a large cell which has a direct line of sight to the sky, which is known as satellite-based synchronization. The main advantage of the satellite-based synchronization is full independency providing a reliable synchronization signal as long as the station remains locked to a minimum number of GPS (Global Positioning System) satellites. Each GPS satellite contains multiple atomic clocks that contribute very precise time data to the GPS signals. GPS receivers on the BS 102A decode these signals, effectively synchronizing the corresponding BS 102A to the atomic clocks. This enables corresponding BS 102A to determine the time within 100 billionths of a second (i.e., 100 nanoseconds), without the cost of owning and operating atomic clocks.

Similarly, the UE 104B can obtain a synchronization timing from the corresponding BS 102B which further obtains its own synchronization timing from the core network 108 or from a GNSS 109, as discussed in detail above. The UEs 104A can also obtain a synchronization timing through the UE 104B in sidelink communications, wherein the synchronization timing of the UE 104B can be either network-based or satellite-based, as described above.

Figure 1B:
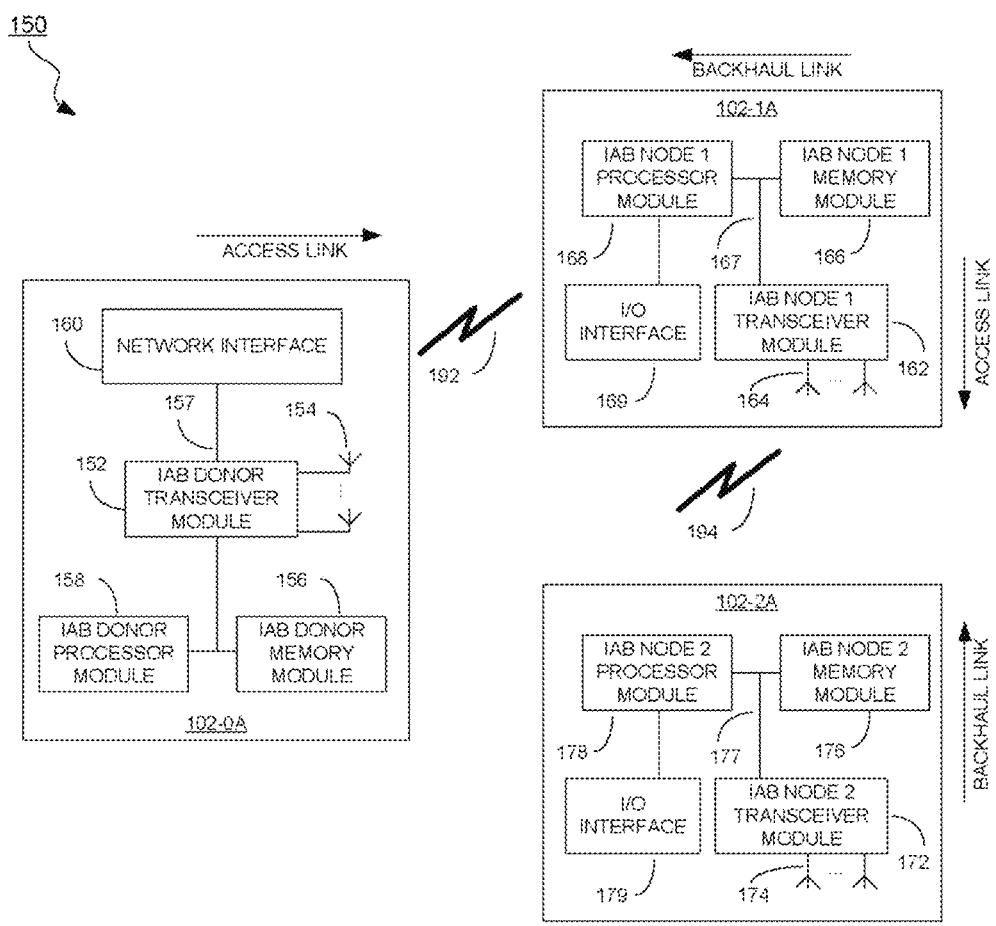
FIG. 1B illustrates a block diagram of an exemplary wireless communication system for transmitting and receiving downlink, uplink and sidelink communication signals, in accordance with some embodiments of the present disclosure.

FIG. 1B illustrates a block diagram of an exemplary wireless communication system 150 for transmitting and receiving downlink, uplink and sidelink communication signals, in accordance with some embodiments of the present disclosure. The system 150 may include components and elements configured to support known or conventional operating features that need not be described in detail herein. In one exemplary embodiment, system 150 can be used to transmit and receive data symbols in a wireless communication environment such as the wireless communication network 100 of FIG. 1A, as described above.

System 150 generally includes a first BS 102A, a second 102B, a first UE 104A and a second UE 104B, collectively referred to as BS 102 and UE 104 below for ease of discussion. The BSs 102 each includes a BS transceiver module 152, a BS antenna array 154, a BS memory module 156, a BS processor module 158, and a network interface 160, each module being coupled and interconnected with one another as necessary via a data communication bus 180. The UE 104 includes a UE transceiver module 162, a UE antenna 164, a UE memory module 166, a UE processor module 168, and an I/O interface 169, each module being coupled and interconnected with one another as necessary via a date communication bus 190. The BS 102 communicates with the UE 104 via a communication channel 192, which can be any wireless channel or other medium known in the art suitable for transmission of data as described herein.

As would be understood by persons of ordinary skill in the art, system 150 may further include any number of modules other than the modules shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

A wireless transmission from a transmitting antenna of the UE 104 to a receiving antenna of the BS 102 is known as an uplink transmission, and a wireless transmission from a transmitting antenna of the BS 102 to a receiving antenna of the UE 104 is known as a downlink transmission. In accordance with some embodiments, a UE transceiver 162 may be referred to herein as an "uplink" transceiver 162 that includes a RF transmitter and receiver circuitry that are each coupled to the UE antenna 164. A duplex switch (not shown) may alternatively couple the uplink transmitter or receiver to the uplink antenna in time duplex fashion. Similarly, in accordance with some embodiments, the BS transceiver 152 may be referred to herein as a "downlink" transceiver 152 that includes RF transmitter and receiver circuitry that are each coupled to the antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink UE antenna 164 for reception of transmissions over the wireless communication channel 192 at the same time that the downlink transmitter is coupled to the downlink antenna array 154. Preferably, there is close synchronization timing with only a minimal guard time between changes in duplex direction. The UE transceiver 162 communicates through the UE antenna 164 with the BS 102 via the wireless communication channel 192 or with other UEs via the wireless communication channel 193. The wireless communication channel 193 can be any wireless channel or other medium known in the art suitable for sidelink transmission of data as described herein.

The UE transceiver 162 and the BS transceiver 152 are configured to communicate via the wireless data communication channel 192, and cooperate with a suitably configured RF antenna arrangement 154/164 that can support a particular wireless communication protocol and modulation scheme. In some exemplary embodiments, the UE transceiver 162 and the BS transceiver 152 are configured to support industry standards such as the Long Term Evolution (LTE) and emerging 5G standards (e.g., NR), and the like. It is understood, however, that the invention is not necessarily limited in application to a particular standard and associated protocols. Rather, the UE transceiver 162 and the BS transceiver 152 may be configured to support alternate, or additional, wireless data communication protocols, including future standards or variations thereof.

The processor modules 158 and 168 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 158 and 168, respectively, or in any practical combination thereof. The memory modules 156 and 166 may be realized as RAM memory, flash memory, ROM memory, EPROM memory, EEPROM memory, registers, a hard disk, a removable disk, a CD-ROM, or any other form of storage medium known in the art. In this regard, the memory modules 156 and 166 may be coupled to the processor modules 158 and 168, respectively, such that the processors modules 158 and 168 can read information from, and write information to, memory modules 156 and 166, respectively. The memory modules 156 and 166 may also be integrated into their respective processor modules 158 and 168. In some embodiments, the memory modules 156 and 166 may each include a cache memory for storing temporary variables or other intermediate information during execution of instructions to be executed by processor modules 158 and 168, respectively. Memory modules 156 and 166 may also each include non-volatile memory for storing instructions to be executed by the processor modules 158 and 168, respectively.

The network interface 160 generally represents the hardware, software, firmware, processing logic, and/or other components of the base station 102 that enable bi-directional communication between BS transceiver 152 and other network components and communication nodes configured to communication with the BS 102. For example, network interface 160 may be configured to support internet or WiMAX traffic. In a typical deployment, without limitation, network interface 160 provides an 802.3 Ethernet interface such that BS transceiver 152 can communicate with a conventional Ethernet based computer network. In this manner, the network interface 160 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the BS 102 to communicate with other BSs or core network over a wired or wireless connection.

Referring again to FIG. 1A, as mentioned above, the BS 102 repeatedly broadcasts system information associated with the BS 102 to one or more UEs (e.g., 104) so as to allow the UE 104 to access the network within the cell (e.g., 101 for BS 102A and 110 for BS 102B) where the BS 102 is located, and in general, to operate properly within the cell. Plural information such as, for example, downlink and uplink cell bandwidths, downlink and uplink configuration, configuration for random access, etc., can be included in the system information, which will be discussed in further detail below. Typically, the BS 102 broadcasts a first signal carrying some major system information, for example, configuration of the cell 101 through a PBCH (Physical Broadcast Channel). For purposes of clarity of illustration, such a broadcasted first signal is herein referred to as "first broadcast signal." It is noted that the BS 102 may subsequently broadcast one or more signals carrying some other system information through respective channels (e.g., a Physical Downlink Shared Channel (PDSCH)), which are herein referred to as "second broadcast signal," "third broadcast signal," and so on.

Referring again to FIG. 1B, in some embodiments, the major system information carried by the first broadcast signal may be transmitted by the BS 102 in a symbol format via the communication channel 192 (e.g., a PBCH). In accordance with some embodiments, an original form of the major system information may be presented as one or more sequences of digital bits and the one or more sequences of digital bits may be processed through plural steps (e.g., coding, scrambling, modulation, mapping steps, etc.), all of which can be processed by the BS processor module 158, to become the first broadcast signal. Similarly, when the UE 104 receives the first broadcast signal (in the symbol format) using the UE transceiver 162, in accordance with some embodiments, the UE processor module 168 may perform plural steps (de-mapping, demodulation, decoding steps, etc.) to estimate the major system information such as, for example, bit locations, bit numbers, etc., of the bits of the major system information. The UE processor module 168 is also coupled to the I/O interface 169, which provides the UE 104 with the ability to connect to other devices such as computers. The I/O interface 169 is the communication path between these accessories and the UE processor module 168.

In some embodiments, the UE 104 can operate in a hybrid/heterogeneous communication network in which the UE communicates with the BS 102, and with other UEs, e.g., between 104A and 104B. As described in further detail below, the UE 104 supports sidelink communications with other UE's as well as downlink/uplink communications between the BS 102 and the UE 104. As discussed above, sidelink communication allows the UEs 104A and 104B within a sidelink communication group 112 to establish a direct communication link with each other, or with other UEs from different cells, without requiring the BS 102 to relay data between UE's.

Figure 2:
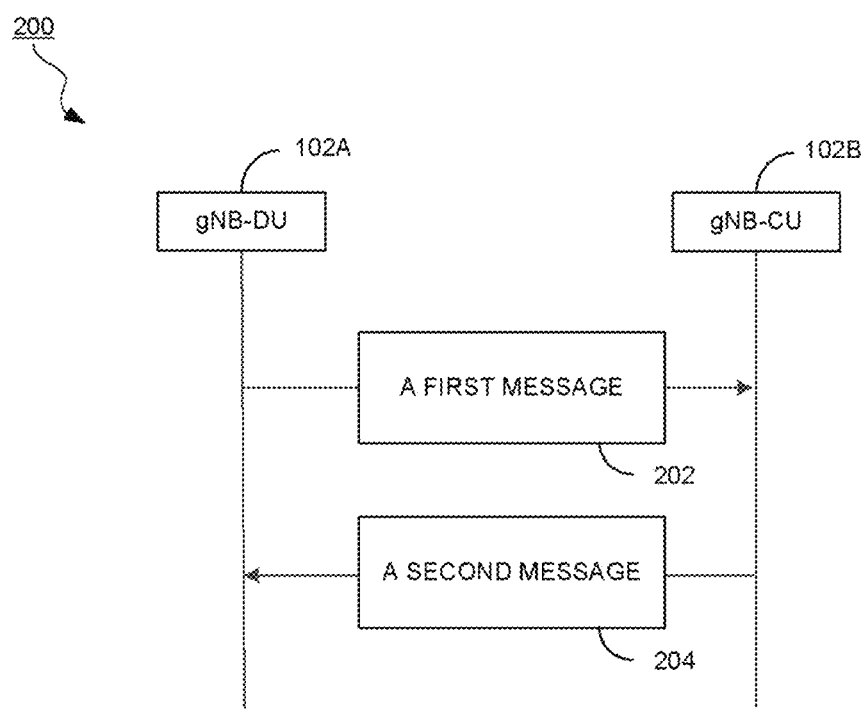
FIG. 2 illustrates a method for configuring integrity information of at least one information block in a system message between a Distributed Unit (DU) and a Central Unit (CU) in a Base Station (BS), in accordance with some embodiments of the present disclosure.

FIG. 2 illustrates a method 200 for configuring integrity information of at least one information block between a Distributed Unit (DU) and a Central Unit (CU) in a BS 102, in accordance with some embodiments of the present disclosure. It is understood that additional operations may be provided before, during, and after the method 200 of FIG. 2, and that some operations may be omitted or reordered. Although a BS 102 in FIG. 2 comprises a Distributed Unit (DU) 102-A and a Central Unit (CU) 102-B, it should be noted that any numbers of CU and DU can be used and are within the scope of this invention.

The method 200 starts with operation 202 in which the DU 102-A of the BS 102 transmits a first message to the CU 102-B of the BS 102 according to some embodiments. In some embodiments, the first message comprises a F1 connection setup request message. In some embodiments, the F1 connection setup request message comprises: a list of cells configured by the DU 102-A and managed by the BS 102, at least one part of a system message of each of the cells that are configured by the DU 102-A, and integrity information of at least one corresponding information block in the system message. In some embodiments, the information block comprises at least one of the following: at least one system information block (SIB) and at least one Master Information Block (MIB).

In some embodiments, the integrity information of the at least one corresponding information block comprises parameters or values that can be used to describe the information integrity in the system message. Generally, information integrity refers to overall completeness, accuracy and consistency of information. Therefore, the integrity information can be used to determine whether the corresponding information block is corrupted. In some embodiments, the integrity information of the at least one corresponding information block configured by the DU 102-A in the system message of a cell comprises at least one of the following: at least one HASH value and at least one digital signature. The at least one HASH value and the at least one digital signature each corresponds to one of the following: at least one SIB and at least one MIB.

In some embodiments, a HASH function can be any function that can be used to map input data of arbitrary size to output data of fixed size. The values returned by a HASH function are called HASH values. If HASH values of two original data is also different, the two original data is different. Therefore, the deterministic nature of a HASH function can be used to determine the information integrity. In some embodiments, a HASH function that can be used to determine a HASH value of information blocks in a system message can be one of the following: a Message-Digest Algorithm (e.g., MD2, MD4, MD5, MD6, and Integrity Primitives Evaluation MD), a Secure Hash Algorithm (e.g., SHA-0, SHA-1, SHA-2 and SHA-3), and a Digital Signature Algorithm. It should be noted these are just examples of HASH functions, which is not intend to be limiting, and any type of HASH functions with different input/output size, sensitivity, and security levels can be used.

In some embodiments, the first message comprises configuration updates to the DU 102-A. In some embodiments, the configuration updates comprise at least one of the following: an updated list of cells configured by the DU 102-A, at least one part of a system message of cells that are configured by the DU 102-A in the updated list of cells, and integrity information of at least one corresponding information block in the system message.

The method 200 continues with operation 204 in which the CU 102-B of the BS 102 transmits a second message to the DU 102-A of the BS 102 according to some embodiments. In some embodiments, the second message comprises a F1 connection setup response message. In some embodiments, the F1 connection setup response message comprises integrity information of at least one corresponding information block configured by the CU 102-B in the system message of cells that are configured by the CU 102-B. In some embodiments, the integrity information of the at least one corresponding information block configured by the CU 102-B in the system message of a cell comprises at least one of the following: at least one HASH value and at least one digital signature. The at least one HASH value and the at least one digital signature each corresponds to one of the following: at least one SIB and at least one MIB. In some embodiments, the F1 connection setup response message further comprises a list of activated cells configured by the DU 102-A, and information of the information blocks in the system message that are required to contain their corresponding integrity information and transmitted to the UE 104 in the activated cells through the air interface.

In some embodiments, the second message comprises a configuration update acknowledgment message. In some embodiments, the configuration update acknowledgement message comprises at least one of the following: the integrity information of the at least one corresponding information block configured by the CU 102-B in the system message of a cell. In some embodiments, the F1 connection setup response message further comprises a list of activated cells configured by the DU 102-A, and information of the information blocks in the system message that are required to contain their corresponding integrity information and transmitted on the air interface in the activated cells to the UE 104.

Figure 3:
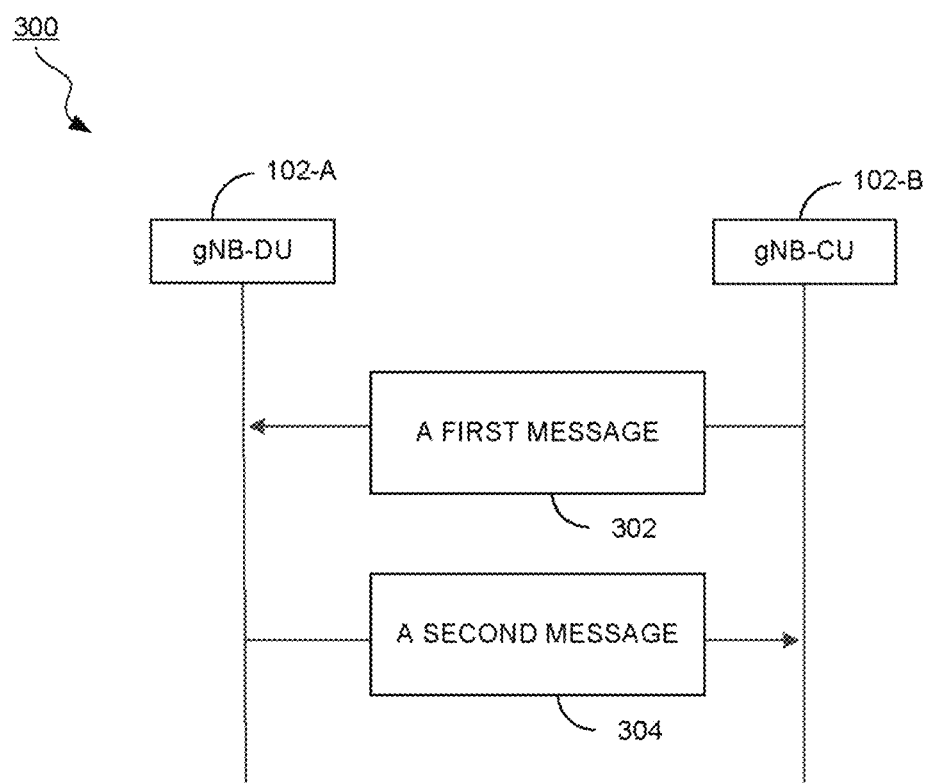
FIG. 3 illustrates a method for configuring integrity information of at least one information block in a system message between a Distributed Unit (DU) and a Central Unit (CU) in a Base Station (BS), in accordance with some embodiments of the present disclosure.

FIG. 3 illustrates a method 300 for configuring integrity information of at least one information block between a Distributed Unit (DU) and a Central Unit (CU) in a Base Station (BS) 102, in accordance with some embodiments of the present disclosure. It is understood that additional operations may be provided before, during, and after the method 300 of FIG. 3, and that some operations may be omitted or reordered. Although a BS 102 in FIG. 2 comprises a Distributed Unit (DU) 102-A and a Central Unit (CU) 102-B, it should be noted that any numbers of CU and DU can be used and are within the scope of this invention.

The method 300 starts with operation 302 in which the CU 102-B of the BS 102 transmits a first message to the DU 102-A of the BS 102 according to some embodiments. In some embodiments, the first message is a configuration update message to the CU 102-B. In some embodiments, the configuration update message comprises integrity information of at least one corresponding information block in a part of the system message of a cell configured by the CU 102-B. In some embodiments, the configuration update message further comprises at least one of the following: a list of activated cells configured by the DU 102-A, and information of the information blocks in the system message that are required to contain their corresponding integrity information and transmitted to the UE 104 in the activated cells through the air interface.

In some embodiments, the integrity information of the at least one corresponding information block configured by the CU 102-B in the system message of a cell comprises at least one of the following: at least one HASH value and at least one digital signature. The at least one HASH value and the at least one digital signature each corresponds to one of the following: at least one SIB and at least one MIB.

In some embodiments, a HASH function can be any function that can be used to map input data of arbitrary size to output data of fixed size. The values returned by a HASH function are called HASH values. If HASH values of two original data is also different, the two original data is different. Therefore, the deterministic nature of a HASH function can be used to determine the information integrity. In some embodiments, a HASH function that can be used to determine a HASH value of information blocks in a system message can be one of the following: a Message-Digest Algorithm (e.g., MD2, MD4, MD5, MD6, and Integrity Primitives Evaluation MD), a Secure Hash Algorithm (e.g., SHA-0, SHA-1, SHA-2 and SHA-3), and a Digital Signature Algorithm. It should be noted these are just examples of HASH functions, which is not intend to be limiting, and any type of HASH functions with different input/output size, sensitivity, and security levels can be used.

The method 300 continues with operation 304 in which the DU 102-A of the BS 102 transmits a second message to the CU 102-B of the BS 102 according to some embodiments. In some embodiments, the second message is a configuration update acknowledgement message. In some embodiments, the configuration update acknowledgement message comprises at least one cell identification (ID) of at least one activated cell in which a transmission of the integrity information of the at least one corresponding information block to the UE 104 on the air interface is failed by the DU 102-A. In some embodiments, when the DU 102-A fails to configure the integration information to the corresponding information blocks, the second message further comprises and at least one reason for the failed configuration of the integrity information.

Figure 4:
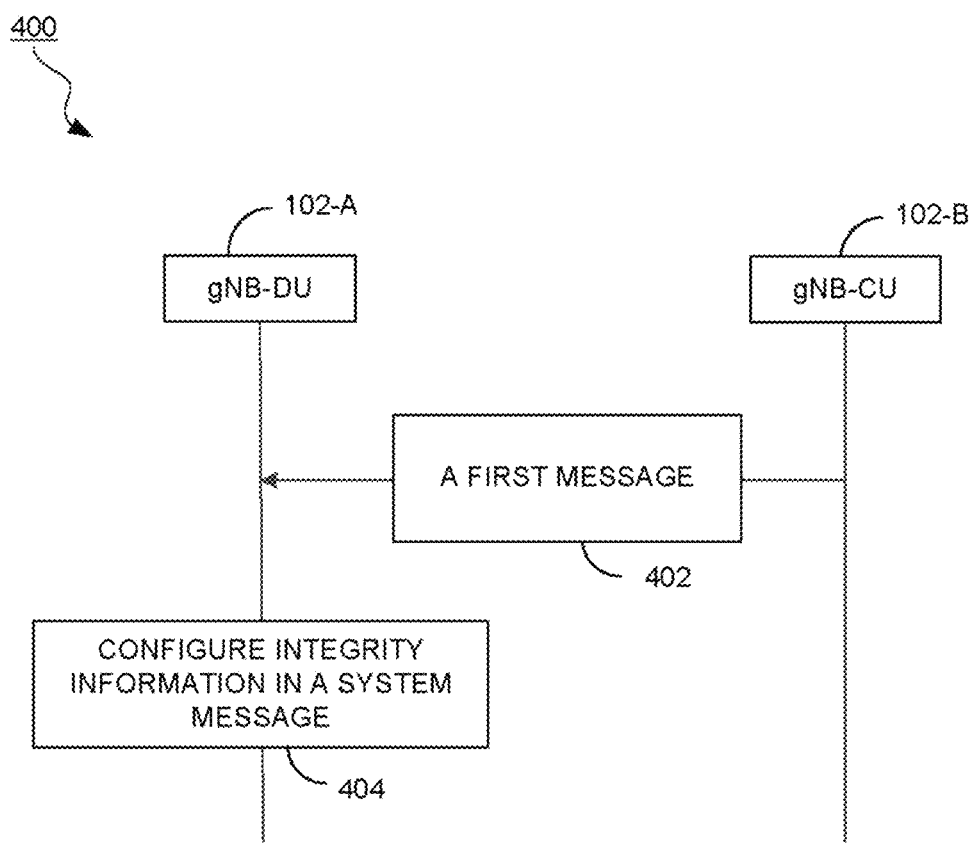
FIG. 4 illustrates a method for configuring integrity information of at least one information block in a system message between a Distributed Unit (DU) and a Central Unit (CU) in a Base Station (BS), in accordance with some embodiments of the present disclosure.

FIG. 4 illustrates a method 400 for configuring integrity information of at least one information block in a system message between a Distributed Unit (DU) and a Central Unit (CU) of a BS 102, in accordance with some embodiments of the present disclosure. It is understood that additional operations may be provided before, during, and after the method 400 of FIG. 4, and that some operations may be omitted or reordered. Although a BS 102 in FIG. 4 comprises a Distributed Unit (DU) 102-A and a Central Unit (CU) 102-B, it should be noted that any numbers of CU and DU can be used and are within the scope of this invention.

The method 400 starts with operation 402 in which the CU 102-B transmits a first message to the DU 102-A according to some embodiments. In some embodiments, the CU 102-B transmits the first message to the DU 102-A, after the BS 102 receives a system information request message from a UE 104 (not shown). In some embodiments, the first message comprises a system information delivery command, wherein the system information delivery command comprises at least one of the following: integrity information of at least one information block of a system message of a cell configured by the CU 102-B. In some embodiments, the system information delivery command further comprises information of the information blocks in the system message that are required to contain or to calculate their corresponding integrity information. In some embodiments, the system information delivery command further comprises information of information blocks that are required to be transmitted to the UE 104 in a cell through the air interface.

In some embodiments, the integrity information of the at least one corresponding information block comprises parameters or values that can be used to describe the integrity of information in the system message. In some embodiments, the integrity information of the at least one corresponding information block configured by the CU 102-B in the system message of a cell comprises at least one of the following: at least one HASH value and at least one digital signature. The at least one HASH value and the at least one digital signature each corresponds to one of the following: at least one SIB and at least one MIB.

The method 400 continues with operation 404 in which the DU 102-A configures integrity information of at least one information block of the system message according to some embodiments of the disclosure. In some embodiments, the information of the at least one information block that requires integrity information configured by the DU 102-A is received from the CU 102-B. In some embodiments, the DU 102-A transmits the integrity information of the at least one information block configured by both of the CU 102-B and the DU 102-A in the system message to the UE 104 through the air interface. In operation 404, the DU 102-A further prepares the system message, which is then transmitted to the UE 104.

Figure 5:
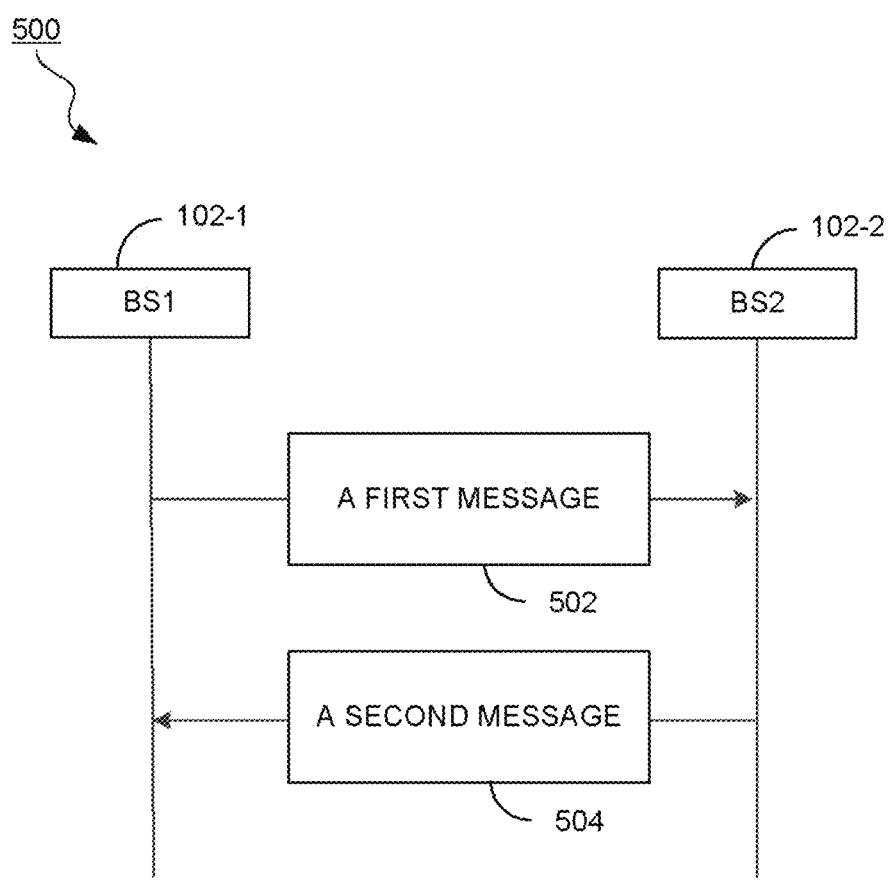
FIG. 5 illustrates a method for configuring integrity information of at least one information block in a system message between different Base Stations (BSs), in accordance with some embodiments of the present disclosure.

FIG. 5 illustrates a method 500 for configuring integrity information of at least one information block in a system message between different BSs 102, in accordance with some embodiments of the present disclosure. It is understood that additional operations may be provided before, during, and after the method 500 of FIG. 5, and that some operations may be omitted or reordered. Although a communication system in FIG. 5 comprises a first BS 102-1 and a second BS 102-2, it should be noted that any numbers of BSs 102 and any numbers of DU/CU can be used and are within the scope of this invention.

The method 500 starts with operation 502 in which the first BS 102-1 transmits a first message to the second BS 102-2 according to some embodiments. In some embodiments, the first message comprises at least one of the following: an X2 or Xn connection setup request message, a cell resource coordination request message, a resource status request message, and a configuration update message. In some embodiments, the first message comprises a list of first cells configured by the first BS 102-1 and integrity information of corresponding at least one information block in a system message of each of the cells configured by the first BS 102-1. In some embodiments, the integrity information of the at least one corresponding information block configured by the first BS 102-1 in the system message of a cell comprises at least one of the following: at least one HASH value and at least one digital signature. The at least one HASH value and the at least one digital signature each corresponds to one of the following: at least one SIB and at least one MIB.

The method 500 continues with operation 504 in which the second BS 102-2 transmits a second message to the first BS 102-1 according to some embodiments. In some embodiments, the second message comprises at least one of the following: an X2 or Xn connection setup response, a cell resource coordination response, a resource status response, and an update acknowledgement, corresponding to the content of the first message. Specifically, the second message comprises an X2 or Xn connection setup response if the first message comprises a X2 or Xn connection setup request; the second message comprises the cell response coordination response if the first message comprises the cell response coordination request; the second message comprises a resource status response if the first message comprises a resource status request; and the second message comprises an update acknowledgement if the first message comprises an update to the BS 102-1. In some embodiments, the second message comprises a list of second cells configured by the second BS 102-2 and integrity information of corresponding at least one information block in a system message. In some embodiments, the integrity information of the at least one corresponding information block configured by the second BS 102-2 in the system message of a cell comprises at least one of the following: at least one HASH value and at least one digital signature. The at least one HASH value and the at least one digital signature each corresponds to one of the following: at least one SIB and at least one MIB.

Figure 6:
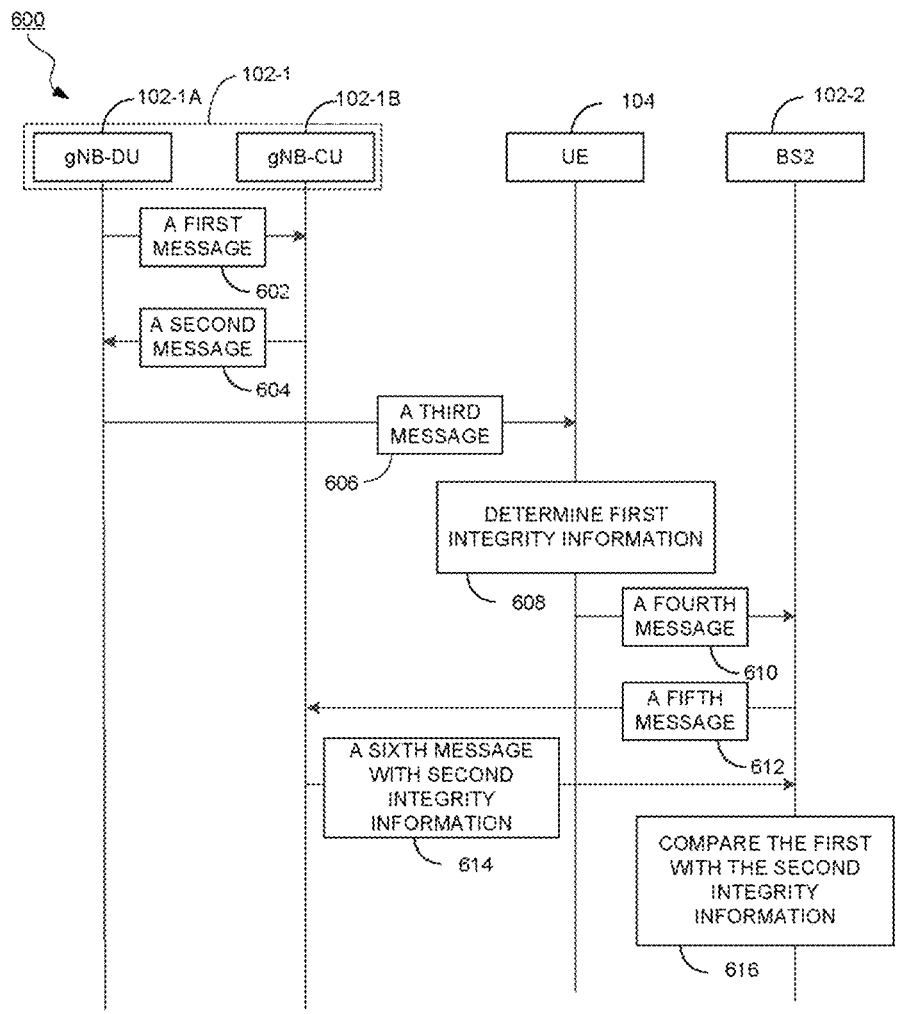
FIG. 6 illustrates a method for authenticating a base station based on integrity information in a system message, in accordance with some embodiments of the present disclosure.

FIG. 6 illustrates a method 600 for authenticating a base station 102 based on integrity information in a system message, in accordance with some embodiments of the present disclosure. It is understood that additional operations may be provided before, during, and after the method 600 of FIG. 6, and that some operations may be omitted or reordered. The communication system in the illustrated embodiment comprises a first BS 102-1, a second BS 102-2 and a UE 104. The first BS 102-1 comprises a Distributed Unit (DU) 102-1A and a Central Unit (CU) 102-1B. Although a communication system in FIG. 6 comprises a first BS 102-1, a second BS 102-2 and a UE 104, it should be noted that any numbers of BSs 102 and UEs 104 can be used and are within the scope of this invention.

The method 600 starts with operation 602 in which in which the DU 102-1A of the BS 102-1 transmits a first message to the CU 102-1B of the BS 102-1 according to some embodiments. In some embodiments, the first message comprises a F1 connection setup request message. In some embodiments, the F1 connection setup request message comprises at least one of the following: a list of cells configured by the DU 102-1A, at least one part of a system message of each of the cells that are configured by the DU 102-1A, and integrity information of at least one corresponding information block in the system message of cells configured by the DU 102-1A. In some embodiments, the information block comprises at least one of the following: at least one system information block (SIB) and at least one Master Information Block (MIB).

In some embodiments, the integrity information of the at least one corresponding information block configured by the DU 102-1A comprises parameters or values that can be used to describe the information integrity in the system message. Generally, information integrity refers to overall completeness, accuracy and consistency of information. Therefore, the integrity information can be used to determine whether the corresponding information block is corrupted. In some embodiments, the integrity information of the at least one corresponding information block configured by the DU 102-1A in the system message of a cell comprises at least one of the following: at least one HASH value and at least one digital signature. The at least one HASH value and the at least one digital signature each corresponds to one of the following: at least one SIB and at least one MIB.

In some embodiments, a HASH function can be any function that can be used to map input data of arbitrary size to output data of fixed size. The values returned by a HASH function are called HASH values. If HASH values of two original data is also different, the two original data is different. Therefore, the deterministic nature of a HASH function can be used to determine the information integrity. In some embodiments, a HASH function that can be used to determine a HASH value of information blocks in a system message can be one of the following: a Message-Digest Algorithm (e.g., MD2, MD4, MD5, MD6, and Integrity Primitives Evaluation MD), a Secure Hash Algorithm (e.g., SHA-0, SHA-1, SHA-2 and SHA-3), and a Digital Signature Algorithm. It should be noted these are just examples of HASH functions, which is not intend to be limiting, and any type of HASH functions with different input/output size, sensitivity, and security levels can be used.

In some embodiments, the first message also comprises configuration updates to the DU 102-1A. In some embodiments, the configuration updates comprises at least one of the following: an updated list of cells configured by the DU 102-1A, at least one part of the system message of cells that are configured by the DU 102-1A in the updated list of cells, and integrity information of at least one corresponding information block in the system message.

The method 600 continues with operation 604 in which the CU 102-1B of the BS 102-1 transmits a second message to the DU 102-1A of the BS 102-1 according to some embodiments. In some embodiments, the second message comprises a F1 connection setup response message. In some embodiments, the F1 connection setup response message comprises integrity information of at least one corresponding information block configured by the CU 102-1B in the system message of cells that are configured by the CU 102-1B. In some embodiments, the integrity information of the at least one corresponding information block configured by the CU 102-1B in the system message of a cell comprises at least one of the following: at least one HASH value and at least one digital signature. The at least one HASH value and the at least one digital signature each corresponds to one of the following: at least one SIB and at least one MIB. In some embodiments, the F1 connection setup response message further comprises a list of activated cells configured by the DU 102-1A, and information of the information blocks in the system message that are required to contain their corresponding integrity information and transmitted on the air interface in the activated cells to the UE 104.

In some embodiments, the second message also comprises a configuration update acknowledgment message. In some embodiments, the configuration update acknowledgement message comprises at least one of the following: the integrity information of the at least one corresponding information block configured by the CU 102-B in the system message of a cell. In some embodiments, the F1 connection setup response message further comprises a list of activated cells configured by the DU 102-A, and information of the information blocks in the system message that are required to contain their corresponding integrity information and transmitted on the air interface in the activated cells to the UE 104.

The method 600 continues with operation 606 in which the first BS 102-1 transmits a third message to the UE 104 according to some embodiments. In some embodiments, the third message is transmitted from the DU 102-1A to the UE 104. In some embodiments, the third message can be a system message. In some other embodiments, the third message can be a specific system message requested by the UE 104. In some embodiments, the system message is transmitted on the air interface to the UE 104.

In some embodiments, the third message comprises an algorithm for calculating integrating information, for example, an HASH function used to calculate at least one HASH value. In some embodiments, the third message also comprises an indication of at least one information block which comprises the integrity information. In some embodiments, the indication can be carried by one information block in a system message. In some other embodiments, a plurality of information blocks in the system message each can carry an indication whether it comprises integrity information. In some embodiments, the third message also comprises first integrity information of the at least one information block in the system message. In some embodiments, the integrity information of the at least one corresponding information block in the system message comprises at least one of the following: at least one HASH value and at least one digital signature. The at least one HASH value and the at least one digital signature each corresponds to one of the following: at least one SIB and at least one MIB. In some embodiments, the plurality of information blocks in a system message each can carry its own corresponding integrity information. In some other embodiments, integrity information of each of the plurality of information blocks are carried by a specific information block. In some embodiments, the plurality of information blocks comprises information blocks that are configured by both the CU 102-1B and the DU 102-1A of the BS 102.

The method 600 continues with operation 608 in which the UE 104 determines second integrity information based on the third message received from the first BS 102-1 according to some embodiments. In some embodiments, the UE 104 can calculate the second integrity information according to the indication of the at least one information block and the algorithm for calculating the integrity information received in the third message.

The method 600 continues with operation 610 in which the UE 104 transmits a fourth message to the second BS 102-2 according to some embodiments. In some embodiments, the second BS 102-2 is a BS that has a RRC (Radio Resource Control) connection with the UE 104. In some embodiments, the second message comprises a measurement report, which comprises the second integrity information calculated by the UE 102 according to the third message received from the first BS 102-1. In some embodiments, the fourth message also comprises a cell ID of the first BS 102-1.

The method 600 continues with operation 612 in which the second BS 102-2 transmits a fifth message to the first BS 102-1, when integrity information of the first BS 102-1 is not stored in the second BS 102-2. In some embodiments, the fifth message comprises one of the following: an X2 or Xn connection setup request, a cell resource coordination request, a resource status request, and a configuration update message. In some embodiments, the fifth message requests the BS 102-1 to report the first integrity information of at least one corresponding system message in at least one cell managed by the BS 102-1.

The method 600 continues with operation 614 in which the second BS 102-2 receives a sixth message from the first BS 102-1 according to some embodiments. In some embodiments, the sixth message comprises at least one of the following: an X2 or Xn connection setup response message, a cell resource coordination response message, a resource status response message, and a configuration update acknowledgement message, corresponding to the content of the fifth message. In some embodiments, the sixth message comprises the first integrity information of the first BS 102-1.

The method 600 continues with operation 616 in which the first integrity information and the second integrity information are compared by the second BS 102-2 according to some embodiments. If the second integrity information does not match with the first integrity information, the first BS 102-1 where in the first message is received from is determined as a fake BS. The cell ID of the first BS 102-1 is then stored in the second BS 102-2, which can be used or transmitted to other adjacent BSs or UEs for determining fake BSs.

Figure 7:
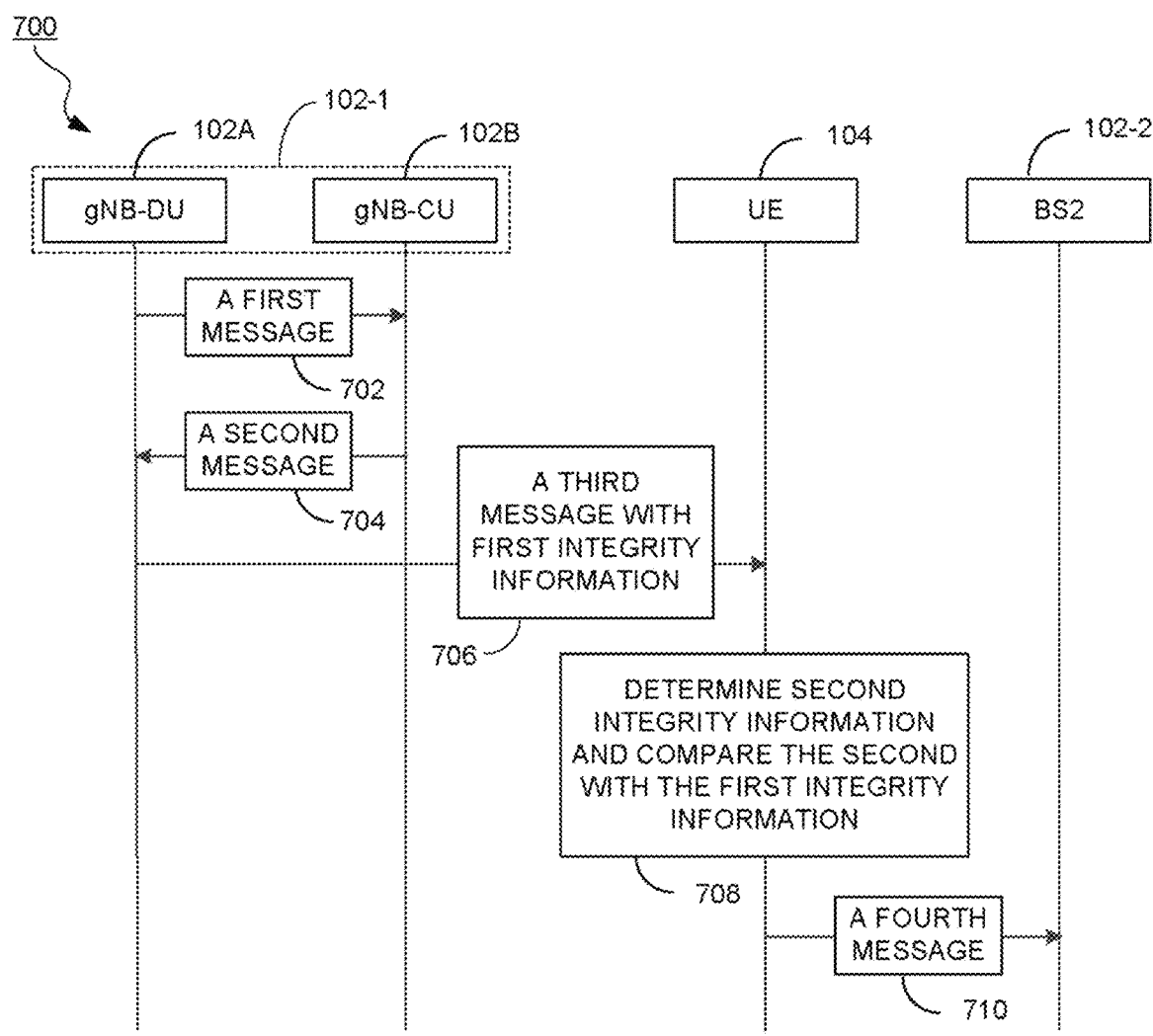
FIG. 7 illustrates a method for authenticating a base station based on integrity information in a system message, in accordance with some embodiments of the present disclosure.

FIG. 7 illustrates a method 700 for authenticating a base station 102 based on integrity information in a system message, in accordance with some embodiments of the present disclosure. It is understood that additional operations may be provided before, during, and after the method 700 of FIG. 7, and that some operations may be omitted or reordered. The communication system in the illustrated embodiment comprises a first BS 102-1, a second BS 102-2 and a UE 104. The first BS 102-1 comprises a Distributed Unit (DU) 102-1A and a Central Unit (CU) 102-1B. Although a communication system in FIG. 7 comprises a first BS 102-1, a second BS 102-2 and a UE 104, it should be noted that any numbers of BSs 102 and UEs 104 can be used and are within the scope of this invention.

The method 700 starts with operation 702 in which in which the DU 102-1A of the BS 102-1 transmits a first message to the CU 102-1B of the BS 102-1 according to some embodiments. In some embodiments, the first message comprises a F1 connection setup request message. In some embodiments, the F1 connection setup request message comprises a list of cells configured by the DU 102-1A, at least one part of a system message of each of the cells that are configured by the DU 102-1A in the list of cells, and integrity information of at least one corresponding information block in the system message. In some embodiments, the information block comprises at least one of the following: at least one system information block (SIB) and at least one Master Information Block (MIB).

In some embodiments, the first message comprises configuration updates to the DU 102-1A. In some embodiments, the configuration updates comprise at least one of the following: an updated list of cells configured by the DU 102-1A, at least one part of a system message of cells that are configured by the DU 102-1A in the updated list of cells, and integrity information of at least one corresponding information block in the system message.

In some embodiments, the integrity information of the at least one corresponding information block comprises parameters or values that can be used to describe the integrity of information in the system message. In some embodiments, the integrity information of the at least one corresponding information block configured by the DU 102-1A in the system message of a cell comprises at least one of the following: at least one HASH value and at least one digital signature. The at least one HASH value and the at least one digital signature each corresponds to one of the following: at least one SIB and at least one MIB.

The method 700 continues with operation 704 in which the CU 102-1B of the BS 102-1 transmits a second message to the DU 102-1A of the BS 102-1 according to some embodiments. In some embodiments, the second message comprises a F1 connection setup response message. In some embodiments, the F1 connection setup response message comprises integrity information of at least one corresponding information block configured by the CU 102-1B in the system message of cells that are configured by the CU 102-1B. In some embodiments, the integrity information of the at least one corresponding information block configured by the CU 102-1B in the system message of a cell comprises at least one of the following: at least one HASH value and at least one digital signature. The at least one HASH value and the at least one digital signature each corresponds to one of the following: at least one SIB and at least one MIB. In some embodiments, the F1 connection setup response message further comprises a list of activated cells configured by the DU 102-1A, and information of the information blocks in the system message that are required to contain their corresponding integrity information and transmitted on the air interface in the activated cells to the UE 104.

In some embodiments, the second message comprises a configuration update acknowledgment message. In some embodiments, the configuration update acknowledgement message comprises at least one of the following: the integrity information of the at least one corresponding information block configured by the CU 102-1B in the system message of a cell. In some embodiments, the F1 connection setup response message further comprises a list of activated cells configured by the DU 102-1A, and information of the information blocks in the system message that are required to contain their corresponding integrity information and transmitted on the air interface in the activated cells to the UE 104.

The method 700 starts with operation 706 in which the first BS 102-1 transmits a third message to the UE 104 according to some embodiments. In some embodiments, the third message is transmitted from the DU 102-1A to the UE 104. In some embodiments, the third message can be a system message. In some other embodiments, the third message can be a specific system message requested by the UE 104. In some embodiments, the system message is transmitted on the air interface to the UE 104.

In some embodiments, the third message comprises first integrity information of the at least one information block in the system message. In some embodiments, the first integrity information comprises the integrity information of the at least one corresponding information block configured by the DU 102-1A and the integrity information of the at least one corresponding information block configured by the CU 102-1B. In some embodiments, the third message also comprises an algorithm for calculating integrating information, for example, an HASH function used to calculate at least one HASH value. In some embodiments, the third message further comprises an indication of at least one information block which comprises the integrity information. In some embodiments, the indication can be carried by one information block in a system message. In some other embodiments, a plurality of information blocks in the system message each can carry an indication whether it comprises integrity information. In some embodiments, the integrity information of the at least one corresponding information block in the system message comprises at least one of the following: at least one HASH value and at least one digital signature. The at least one HASH value and the at least one digital signature each corresponds to one of the following: at least one SIB and at least one MIB. In some embodiments, the plurality of information blocks in a system message each can carry its own corresponding integrity information. In some other embodiments, integrity information of each of the plurality of information blocks are carried by a specific information block. In some embodiments, the plurality of information blocks comprises information blocks that are configured by both the CU 102-1B and the DU 102-1A of the BS 102.

The method 700 continues with operation 708 in which the UE 104 determines second integrity information based on the third message received from the first BS 102-1 according to some embodiments. In some embodiments, the UE 104 can calculate the second integrity information according to the indication of the at least one information block and the algorithm for calculating the integrity information received in the third message. In some embodiments, after determining the second integrity information, the UE 104 compares the first integrity information received from the third message from the BS 102-1 with the second integrity information to determine if the system message is altered. In some embodiments, when the first integrity information does not match the second integrity information, the BS 102-1 is determined as a fake BS. In some embodiments, information of the fake BS 102-1, for example a cell identifier or a cell ID, is stored in the UE 104.

The method 700 continues with operation 710 in which the UE 104 transmits a fourth message to the second BS 102-2 according to some embodiments. In some embodiments, the second BS 102-2 is a BS that has a RRC (Radio Resource Control) connection with the UE 104. In some embodiments, the fourth message comprises a measurement report, which comprises a cell ID of the fake first BS 102-1.

Figure 8:
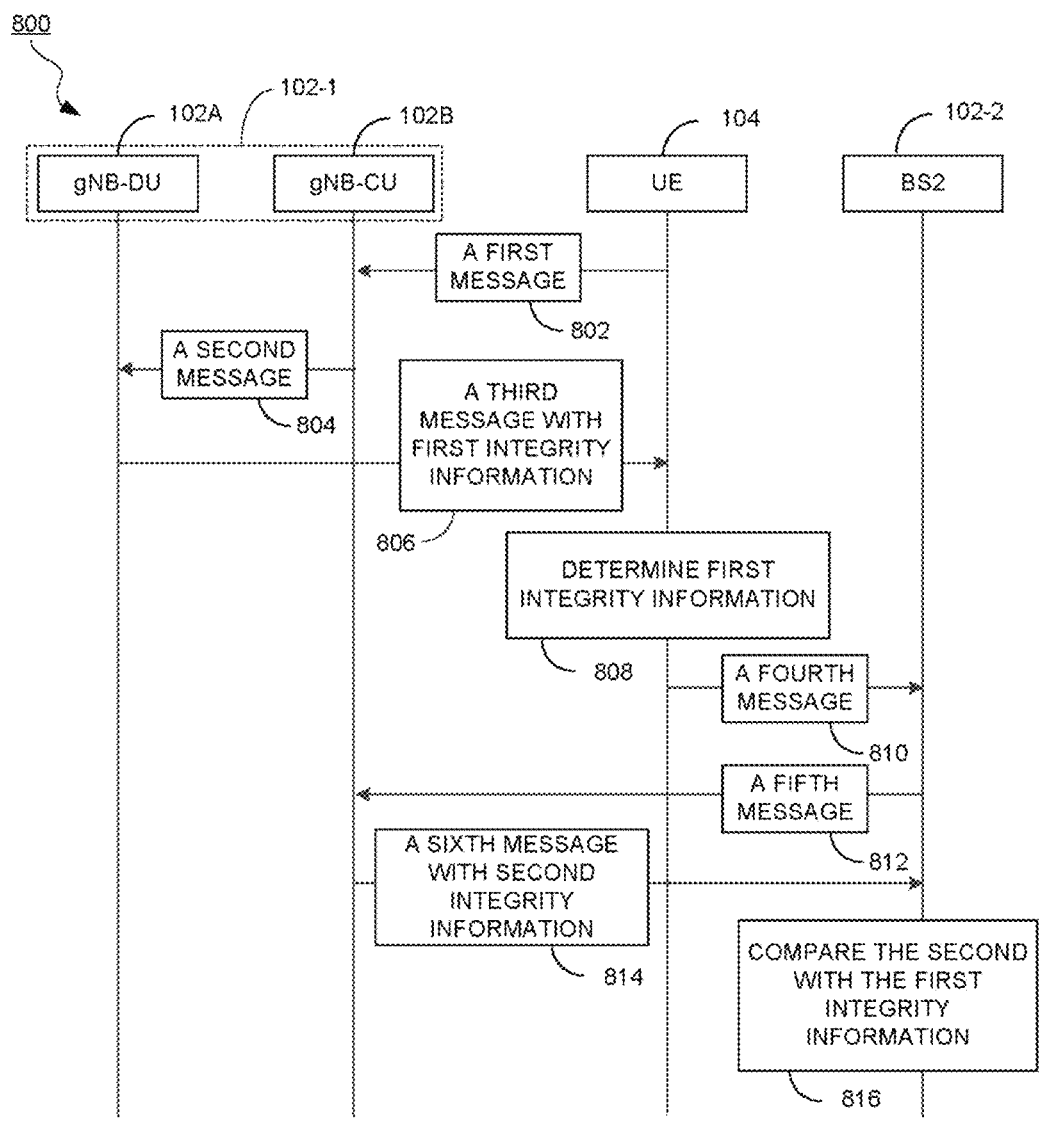
FIG. 8 illustrates a method for authenticating a base station based on integrity information in a system message, in accordance with some embodiments of the present disclosure.

FIG. 8 illustrates a method 800 for authenticating a base station 102 based on integrity information in a system message, in accordance with some embodiments of the present disclosure. It is understood that additional operations may be provided before, during, and after the method 800 of FIG. 8, and that some operations may be omitted or reordered. The communication system in the illustrated embodiment comprises a first BS 102-1, a second BS 102-2 and a UE 104. The first BS 102-1 comprises a Distributed Unit (DU) 102-1A and a Central Unit (CU) 102-1B. Although a communication system in FIG. 8 comprises a first BS 102-1, a second BS 102-2 and a UE 104, it should be noted that any numbers of BSs 102 and UEs 104 can be used and are within the scope of this invention.

The method 800 starts with operation 802 in which the UE 104 transmits a first message to the first BS 102-1 according to some embodiments. In some embodiments, the first message comprises a request message from the UE 104 to the first BS 102-1 for at least one specific system information block. In some embodiments, the request message is a system information request message configured for the UE 104 to request certain specific system information blocks configured by the first BS 102-1. In some embodiments, the first message is transmitted by the UE 104 to the CU 102-1B of the first BS 102-1.

The method 800 continues with operation 804 in which the CU 102-1B transmits a second message to the DU 102-1A of the first BS 102-1 according to some embodiments. In some embodiments, the second message comprises a system information delivery command, wherein the system information delivery command comprises integrity information of at least one information block in the corresponding system messages of cells configured by the CU 102-1B. In some embodiments, the integrity information of the at least one corresponding information block in the system message of a cell configured by the CU 102-1B comprises at least one of the following: at least one HASH value and at least one digital signature. The at least one HASH value and the at least one digital signature each corresponds to one of the following: at least one SIB and at least one MIB.

In some embodiments, the system information delivery command further comprises information of the information blocks in the system message that are required to contain or to calculate their corresponding integrity information. In some embodiments, the system information delivery command further comprises information of information blocks that are required to be transmitted from the DU 102-1A of the first BS 102-1 to the UE 104 through the air interface. In some embodiments, the system information delivery command further comprises a list of activated cells configured by the DU 102-1A.

The method 800 continues with operation 806 in which the DU 102-A configures integrity information of the system message and transmits the system message to the UE 104 according to some embodiments of the disclosure. In some embodiments, the DU 102-A transmits the integrity information of the at least one information block configured by both of the DU 102-A and the CU 102-B in the system message to the UE 104 through the air interface.

In some embodiments, the third message also comprises first integrity information of the at least one information block in the system message. In some embodiments, the first integrity information comprises the integrity information of the at least one corresponding information block configured by the DU 102-1A and the integrity information of the at least one corresponding information block configured by the CU 102-1B. In some embodiments, the third message comprises an algorithm for calculating integrating information, for example, an HASH function used to calculate at least one HASH value. In some embodiments, the third message also comprises an indication of at least one information block which comprises the integrity information. In some embodiments, the indication can be carried by one information block in a system message. In some other embodiments, a plurality of information blocks in the system message each can carry an indication whether it comprises integrity information. In some embodiments, the integrity information of the at least one corresponding information block in the system message comprises at least one of the following: at least one HASH value and at least one digital signature. The at least one HASH value and the at least one digital signature each corresponds to one of the following: at least one SIB and at least one MIB. In some embodiments, the plurality of information blocks in a system message each can carry its own corresponding integrity information. In some other embodiments, integrity information of each of the plurality of information blocks are carried by a specific information block. In some embodiments, the plurality of information blocks comprises information blocks that are configured by both the CU 102-1B and the DU 102-1A of the BS 102.

The method 800 continues with operation 808 in which the UE 104 determines second integrity information based on the third message received from the first BS 102-1 according to some embodiments. In some embodiments, the UE 104 can calculate the second integrity information according to the indication of the at least one information block and the algorithm for calculating the integrity information received in the third message.

The method 800 continues with operation 810 in which the UE 104 transmits a fourth message to the second BS 102-2 according to some embodiments. In some embodiments, the second BS 102-2 is a BS that has a RRC (Radio Resource Control) connection with the UE 104. In some embodiments, the second message comprises a measurement report, which comprises the second integrity information calculated by the UE 102 according to the third message received from the first BS 102-1. In some embodiments, the fourth message also comprises a cell ID of the first BS 102-1.

The method 800 continues with operation 812 in which the second BS 102-2 transmits a fifth message to the first BS 102-1, when integrity information of the first BS 102-1 is not stored in the second BS 102-2. In some embodiments, the fifth message comprises one of the following: an X2 or Xn connection setup request, a cell resource coordination request, a resource status request, and a configuration update of the BS 102-1. In some embodiments, the fifth message requests the BS 102-1 to report the first integrity information of at least one corresponding system message in at least one cell managed by the BS 102-1.

The method 800 continues with operation 814 in which the second BS 102-2 receives a sixth message from the first BS 102-1 according to some embodiments. In some embodiments, the sixth message comprises at least one of the following: an X2 or Xn connection setup response message, a cell resource coordination response message, a resource status response message, and a configuration update acknowledgement message, corresponding to the content of the fifth message. In some embodiments, the sixth message comprises the first integrity information of the first BS 102-1.

The method 800 continues with operation 816 in which the first integrity information and the second integrity information are compared by the second BS 102-2 according to some embodiments. If the second integrity information does not match with the first integrity information, the first BS 102-1 where in the first message is received from is determined as a fake BS. The cell ID of the first BS 102-1 is then stored in the second BS 102-2, which can be used or transmitted to other adjacent BSs or UEs for determining fake BSs.

Figure 9:
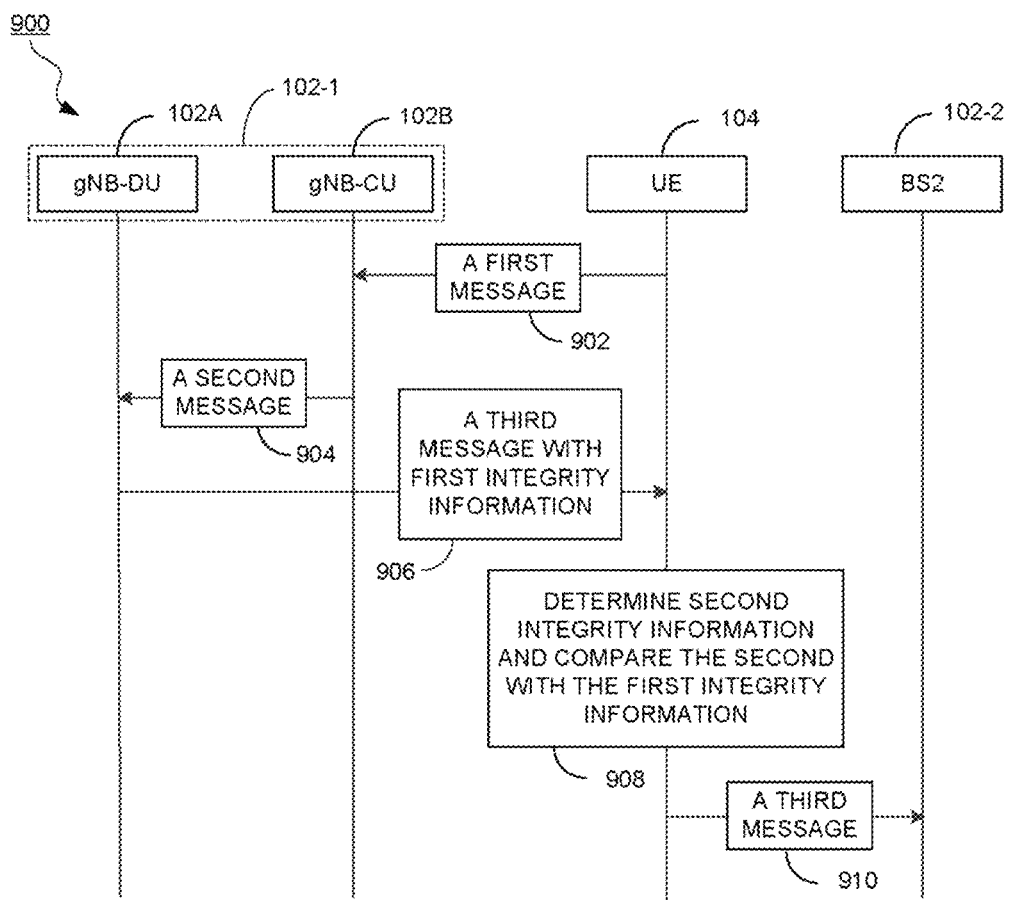
FIG. 9 illustrates a method for authenticating a base station based on integrity information in a system message, in accordance with some embodiments of the present disclosure.

FIG. 9 illustrates a method 900 for authenticating a base station 102 based on integrity information in a system message, in accordance with some embodiments of the present disclosure. It is understood that additional operations may be provided before, during, and after the method 900 of FIG. 9, and that some operations may be omitted or reordered. The communication system in the illustrated embodiment comprises a first BS 102-1, a second BS 102-2 and a UE 104. The first BS 102-1 comprises a Distributed Unit (DU) 102-1A and a Central Unit (CU) 102-1B. Although a communication system in FIG. 9 comprises a first BS 102-1, a second BS 102-2 and a UE 104, it should be noted that any numbers of BSs 102 and UEs 104 can be used and are within the scope of this invention.

The method 900 starts with operation 902 in which the UE 104 transmits a first message to the first BS 102-1 according to some embodiments. In some embodiments, the first message comprises an information block request message from the UE 104 to the first BS 102-1 for at least one specific system information block. In some embodiments, the request message is a system information request message configured for the UE 104 to request certain specific system information blocks configured by the first BS 102-1. In some embodiments, the first message is transmitted by the UE 104 to the CU 102-1B of the first BS 102-1.

The method 900 continues with operation 904 in which the CU 102-1B transmits a second message to the DU 102-1A of the first BS 102-1 according to some embodiments. In some embodiments, the second message comprises a system information delivery command, wherein the system information delivery command comprises integrity information of at least one information block in the corresponding system messages of cells configured by the CU 102-1B. In some embodiments, the integrity information of the at least one corresponding information block in the system message of a cell configured by the CU 102-1B comprises at least one of the following: at least one HASH value and at least one digital signature. The at least one HASH value and the at least one digital signature each corresponds to one of the following: at least one SIB and at least one MIB.

In some embodiments, the system information delivery command further comprises information of the information blocks in the system message that are required to contain or to calculate their corresponding integrity information. In some embodiments, the system information delivery command further comprises information of information blocks that are required to be transmitted from the DU 102-1A of the first BS 102-1 to the UE 104 through the air interface. In some embodiments, the system information delivery command further comprises a list of activated cells configured by the DU 102-1A.

The method 900 continues with operation 906 in which the DU 102-1A configures integrity information of the system message and transmits the system message to the UE 104 according to some embodiments of the disclosure. In some embodiments, the DU 102-1A transmits the integrity information of the at least one information block configured by both of the DU 102-1A and the CU 102-1B in the system message to the UE 104 through the air interface.

In some embodiments, the third message also comprises first integrity information of the at least one information block in the system message configured by the first BS 102-1. In some embodiments, the first integrity information comprises the integrity information of the at least one corresponding information block configured by the DU 102-1A and the integrity information of the at least one corresponding information block configured by the CU 102-1B. In some embodiments, the third message also comprises an algorithm for calculating integrating information, for example, an HASH function used to calculate at least one HASH value. In some embodiments, the third message further comprises an indication of at least one information block which comprises the integrity information. In some embodiments, the indication can be carried by one information block in a system message. In some other embodiments, a plurality of information blocks in the system message each can carry an indication whether it comprises integrity information. In some embodiments, the integrity information of the at least one corresponding information block in the system message comprises at least one of the following: at least one HASH value and at least one digital signature. The at least one HASH value and the at least one digital signature each corresponds to one of the following: at least one SIB and at least one MIB. In some embodiments, the plurality of information blocks in a system message each can carry its own corresponding integrity information. In some other embodiments, integrity information of each of the plurality of information blocks are carried by a specific information block. In some embodiments, the plurality of information blocks comprises information blocks that are configured by both the CU 102-1B and the DU 102-1A of the BS 102.

The method 900 continues with operation 908 in which the UE 104 determines second integrity information based on the third message received from the first BS 102-1 according to some embodiments. In some embodiments, the UE 104 can calculate the second integrity information according to the indication of the at least one information block and the algorithm for calculating the integrity information received in the third message. In some embodiments, after determining the second integrity information, the UE 104 compares the first integrity information received from the third message from the BS 102-1 with the second integrity information to determine if the system message is altered. In some embodiments, when the first integrity information does not match the second integrity information, the BS 102-1 is determined as a fake BS. In some embodiments, information of the fake BS 102-1, for example, a cell identifier or a cell ID, is stored in the UE 104.

The method 900 continues with operation 910 in which the UE 104 transmits a fourth message to the second BS 102-2 according to some embodiments. In some embodiments, the second BS 102-2 is a BS that has a RRC (Radio Resource Control) connection with the UE 104. In some embodiments, the fourth message comprises a measurement report, which comprises a cell ID of the fake first BS 102-1.

Figure 10:
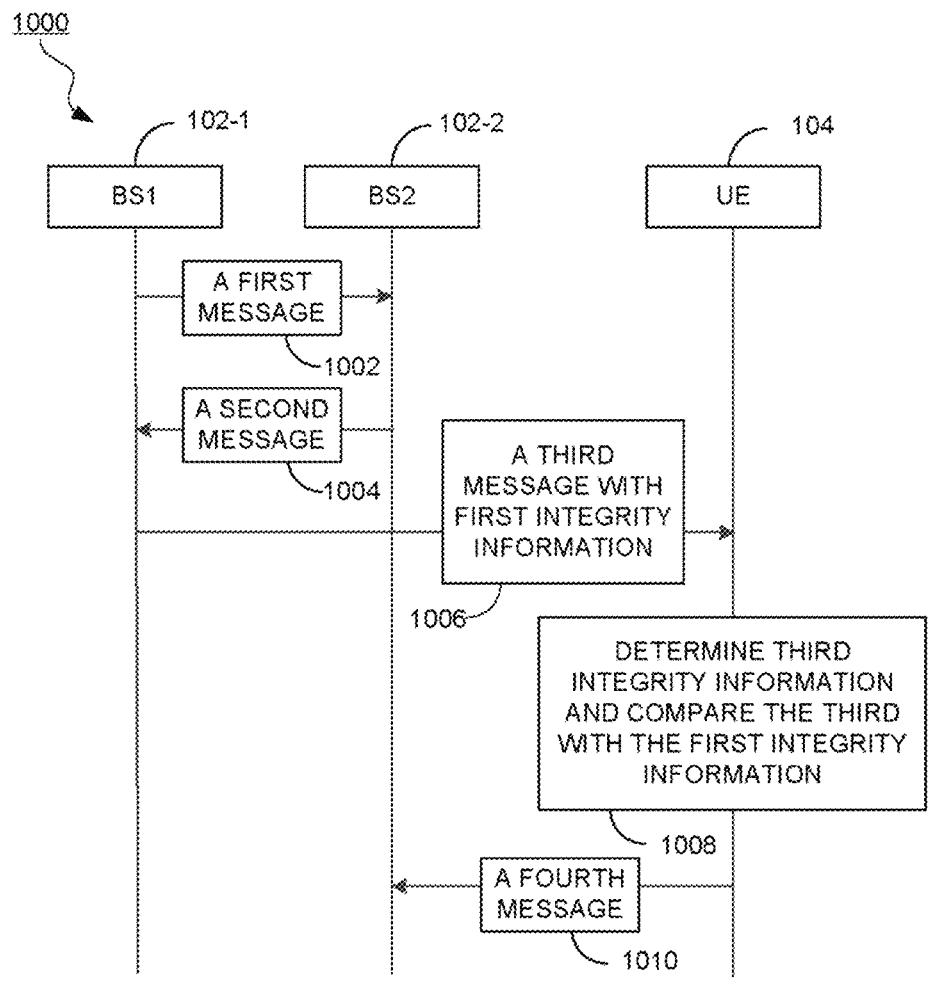
FIG. 10 illustrates a method for authenticating a base station based on integrity information in a system message, in accordance with some embodiments of the present disclosure.

FIG. 10 illustrates a method 1000 for authenticating a base station 102 based on integrity information in a system message, in accordance with some embodiments of the present disclosure. It is understood that additional operations may be provided before, during, and after the method 1000 of FIG. 10, and that some operations may be omitted or reordered. The communication system in the illustrated embodiment comprises a first BS 102-1, a second BS 102-2 and a UE 104. Although a communication system in FIG. 10 comprises a first BS 102-1, a second BS 102-2 and a UE 104, it should be noted that any numbers of BSs 102 and UEs 104 can be used and are within the scope of this invention.

The method 1000 starts with operation 1002 in which the first BS 102-1 transmits a first message to the second BS 102-2 according to some embodiments. In some embodiments, the first message comprises at least one of the following: an X2 or Xn connection setup request, a cell resource coordination request, a resource status request, and an update to the BS 102-1. In some embodiments, the first message comprises a list of first cells configured by the first BS 102-1 and first integrity information of corresponding at least one information block in a system message configured by the first BS 102-1. In some embodiments, the first integrity information of the at least one corresponding information block comprises parameters or values that can be used to describe the integrity of information in the system message. In some embodiments, the first integrity information of the at least one corresponding information block configured by the first BS 102-1 in the system message of a cell comprises at least one of the following: at least one HASH value and at least one digital signature. The at least one HASH value and the at least one digital signature each corresponds to one of the following: at least one SIB and at least one MIB. In some embodiments, the first integrity information from the first BS 102-1 is stored in the second BS 102-2.

The method 1000 continues with operation 1004 in which the second BS 102-2 transmits a second message to the first BS 102-1 according to some embodiments. In some embodiments, the second message comprises at least one of the following: an X2 or Xn connection setup response, a cell resource coordination response, a resource status response, and an update acknowledgement, corresponding to the content of the first message. Specifically, the second message comprises an X2 or Xn connection setup response if the first message comprises a X2 or Xn connection setup request; the second message comprises the cell response coordination response if the first message comprises the cell response coordination request; the second message comprises a resource status response if the first message comprises a resource status request; and the second message comprises an update acknowledgement if the first message comprises an update to the BS 102-1.

In some embodiments, the second message comprises a list of second cells configured by the second BS 102-2 and second integrity information of corresponding at least one information block in a system message configured by the second BS 102-2. In some embodiments, the second integrity information of the at least one corresponding information block comprises parameters or values that can be used to describe the integrity of information in the system message. In some embodiments, the second integrity information of the at least one corresponding information block configured by the second BS 102-2 in the system message of a cell comprises at least one of the following: at least one HASH value and at least one digital signature. The at least one HASH value and the at least one digital signature each corresponds to one of the following: at least one SIB and at least one MIB. In some embodiments, the second integrity information from the second BS 102-1 is stored in the first BS 102-2.

The method 1000 continues with operation 1006 in which the first BS 102-1 transmits a third message to the UE 104 according to some embodiments. In some embodiments, the first BS 102-1 transmits the first integrity information of the at least one information block in the system message configured by the first BS 102-1 to the UE 104 through the air interface.

In some embodiments, the third message also comprises first integrity information of the at least one information block in the system message configured by the first BS 102-1. In some embodiments, the third message also comprises an algorithm for calculating integrating information, for example, an HASH function used to calculate at least one HASH value. In some embodiments, the third message further comprises an indication of at least one information block which comprises the integrity information. In some embodiments, the indication can be carried by one information block in a system message. In some other embodiments, a plurality of information blocks in the system message each can carry an indication whether it comprises integrity information. In some embodiments, the integrity information of the at least one corresponding information block in the system message comprises at least one of the following: at least one HASH value and at least one digital signature. The at least one HASH value and the at least one digital signature each corresponds to one of the following: at least one SIB and at least one MIB. In some embodiments, the plurality of information blocks in a system message each can carry its own corresponding integrity information. In some other embodiments, integrity information of each of the plurality of information blocks are carried by a specific information block. In some embodiments, the plurality of information blocks comprises information blocks that are configured by both the CU 102-1B and the DU 102-1A of the BS 102.

The method 1000 continues with operation 1008 in which the UE 104 determines third integrity information based on the third message received from the first BS 102-1 according to some embodiments. In some embodiments, the UE 104 can calculate the third integrity information according to the indication of the at least one information block and the algorithm for calculating the integrity information received in the third message. In some embodiments, after determining the third integrity information, the UE 104 compares the first integrity information received from the third message from the first BS 102-1 with the third integrity information to determine if the system message is altered. In some embodiments, when the first integrity information does not match the third integrity information, the first BS 102-1 is determined as a fake BS. In some embodiments, information of the fake BS 102-1, for example, a cell identifier or a cell ID, is stored in the UE 104.

The method 1000 continues with operation 1010 in which the UE 104 transmits a fourth message to the second BS 102-2 according to some embodiments. In some embodiments, the second BS 102-2 is a BS that has a RRC (Radio Resource Control) connection with the UE 104. In some embodiments, the fourth message comprises a measurement report, which comprises a cell ID of the fake first BS 102-1.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method for authenticating a first wireless communication node, comprising:
    transmitting a first message from a first unit of the first wireless communication node to a second unit of the first wireless communication node, wherein the first message comprises first integrity information of at least one first information block in a system message configured by the first unit;
    receiving a second message by the first unit of the first wireless communication node from the second unit of the first wireless communication node, wherein the second message comprises second integrity information of at least one second information block in a system message configured by the second unit; and
    transmitting a third message from the first wireless communication node to a wireless communication device, wherein the third message comprises third integrity information and is configured to be used by the wireless communication device to determine fourth integrity information,
    wherein the third integrity information corresponds to at least one third information block, and wherein the third message further comprises at least one of a HASH function or an indication of the at least one third information block.

2. The method of claim 1, wherein the first message comprises one of the following: an F1 connection setup request message and a configuration update message.

3. The method of claim 1, wherein the second message comprises one of the following: an F1 connection setup response message and a configuration update acknowledgement message.

4. The method of claim 1, wherein the at least one first information block and the at least one second information block each comprises one of the following: a System Information Block (SIB) and a Master Information Block (MIB).

5. The method of claim 1, wherein the first integrity information, the second integrity information, the third integrity information and the fourth integrity information each comprises at least one of the following: a HASH value and a digital signature.

6. The method of claim 1, wherein the first unit is a Distribution Unit (DU) and the second unit is a Central Unit (CU).

7. The method of claim 1, wherein the third information block comprises: the at least one first information block and the at least one second information block.

8. The method of claim 1, wherein the indication of the at least one third information block is carried by one of the following: a fourth information block in the third message and the at least one corresponding third information block.

9. The method of claim 1, wherein the HASH function is one of the following: a Message-Digest Algorithm, a Secure Hash Algorithm, and a Digital Signature Algorithm.

10. The method of claim 1, wherein the third message is transmitted through an air interface.

11. The method of claim 1, further comprising:
    receiving a fourth message by a second wireless communication node from the wireless communication device, wherein the fourth message comprises the fourth integrity information;
    transmitting a fifth message by the second wireless communication node to the first wireless communication node;
    receiving a sixth message by the second wireless communication node from the first wireless communication node, wherein the sixth message comprises the third integrity information;
    determining whether the third integrity information matches the fourth integrity information by the second wireless communication node; and
    in response to determining that the third integrity information does not match the fourth integrity information, storing a cell ID of the first wireless communication node in the second wireless communication node, wherein the first wireless communication node is determined to be fake.

12. The method of claim 11, wherein the fifth message comprises one of the following: an X2 or Xn connection setup request, a cell resource coordination request, a resource status request, and a configuration update message.

13. The method of claim 11, wherein the sixth message comprises one of the following: an X2 or Xn connection setup response message, a cell resource coordination response message, a resource status response message, and a configuration update acknowledgement message.

14. A method for authenticating a first wireless communication node, comprising:
- transmitting a first message from the first wireless communication node to a second wireless communication node, wherein the first message comprises first integrity information of at least one first information block in a system message configured by the first wireless communication node;
- receiving a second message by the first wireless communication node from the second wireless communication node, wherein the second message comprises second integrity information of at least one second information block in a system message configured by the second wireless communication node;
- transmitting a third message from the first wireless communication node to a wireless communication device, wherein the third message comprises third integrity information, and is configured to be used by the wireless communication device to determine third integrity information,
- wherein the third integrity information corresponds to at least one third information block, and wherein the third message further comprises at least one of a HASH function or an indication of the at least one third information block.

15. The method of claim 14, wherein the first message comprises one of the following: an X2 or Xn connection setup request, a cell resource coordination request, a resource status request, and a configuration update message.

16. The method of claim 14, wherein the second message comprises one of the following: an X2 or Xn connection setup response message, a cell resource coordination response message, a resource status response message, and a configuration update acknowledgement message.

17. A method for authenticating a first wireless communication node, comprising:
- receiving a first message by a first unit of the first wireless communication node from a wireless communication device;
- receiving a second message by a second unit of the first wireless communication node from the first unit of the first wireless communication node, wherein the second message comprises first integrity information of at least one first information block configured by the first unit;
- transmitting a third message from the second unit of the first wireless communication node to the wireless communication device, wherein the third message comprises second integrity information of at least one second information block, and is configured to be used by the wireless communication device to determine third integrity information,
- wherein the third message further comprises at least one of a HASH function or an indication of the at least one second information block.

18. A computing device comprising at least one processor and a transceiver configured to
- transmit a first message from a first unit of the first wireless communication node to a second unit of the first wireless communication node, wherein the first message comprises first integrity information of at least one first information block in a system message configured by the first unit;
- receive a second message at the first unit of the first wireless communication node from the second unit of the first wireless communication node, wherein the second message comprises second integrity information of at least one second information block in a system message configured by the second unit; and
- transmit a third message from the first wireless communication node to a wireless communication device, wherein the third message comprises third integrity information and is configured to be used by the wireless communication device to determine fourth integrity information,
- wherein the third integrity information corresponds to at least one third information block, and wherein the third message further comprises at least one of a HASH function or an indication of the at least one third information block.

19. A computing device comprising at least one processor and a transceiver configured to:
- receive a first message at a first unit of the first wireless communication node from a wireless communication device;
- receive a second message at a second unit of the first wireless communication node from the first unit of the first wireless communication node, wherein the second message comprises first integrity information of at least one first information block configured by the first unit;
- transmit a third message from the second unit of the first wireless communication node to the wireless communication device, wherein the third message comprises second integrity information of at least one second information block, and is configured to be used by the wireless communication device to determine third integrity information,
- wherein the third message further comprises at least one of a HASH function or an indication of the at least one second information block.

* * * * *